United States Patent
Jedlinski et al.

(10) Patent No.: US 12,208,350 B2
(45) Date of Patent: Jan. 28, 2025

(54) FILTER VALVE ASSEMBLY

(71) Applicant: Hamilton Sundstrand Corporation, Charlotte, NC (US)

(72) Inventors: Marek Jedlinski, Wilczyce (PL); Damian Slodczyk, Wroclaw (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 335 days.

(21) Appl. No.: 17/738,071

(22) Filed: May 6, 2022

(65) Prior Publication Data
US 2022/0370936 A1 Nov. 24, 2022

(30) Foreign Application Priority Data
May 21, 2021 (EP) .................................... 21461541

(51) Int. Cl.
*B01D 35/147* (2006.01)
*B01D 29/35* (2006.01)
(Continued)

(52) U.S. Cl.
CPC ........... *B01D 35/147* (2013.01); *B01D 29/35* (2013.01); *B01D 29/96* (2013.01); *B01D 35/02* (2013.01);
(Continued)

(58) Field of Classification Search
CPC ...... B01D 35/147; B01D 29/35; B01D 29/96; B01D 35/02; B01D 35/30; B01D 2201/16;
(Continued)

(56) References Cited

U.S. PATENT DOCUMENTS 3,420,375 A 1/1969 Kudlaty et al.
4,053,410 A * 10/1977 Lorimor ............... B01D 29/114
210/172.6
(Continued)

FOREIGN PATENT DOCUMENTS

EP 1350551 B1 5/2006
GB 2162079 A 1/1986
(Continued)

OTHER PUBLICATIONS

Abstract EP1350551 (B1), Published on May 24, 2006, 1 page.
European Search Report for Application No. 21461541.1, mailed Oct. 20, 2021, 7 pages.

*Primary Examiner* — Madeline Gonzalez
(74) *Attorney, Agent, or Firm* — CANTOR COLBURN LLP (57) ABSTRACT

A filter assembly includes a manifold having a fluid inlet and a fluid outlet and a filter housing having a filter medium provided therein. The filter medium defines an inner filter chamber and defining an outer filter chamber between the filter medium and the filter housing. The filter housing is removably attached to the manifold so as to provide a fluid flow path from the inlet into the inner filter chamber, through the filter medium into the outer chamber and out of the outlet. The filter assembly also includes a valve assembly mounted inside the manifold, and a by-pass channel defined inside the manifold between the fluid inlet and the fluid outlet. The valve assembly comprises a valve spool and a valve spring arranged in engagement with the spool to bias the spool into a first position and to compress, in response to a pressure differential across the valve spool.

10 Claims, 8 Drawing Sheets

(51) Int. Cl.
*B01D 29/96* (2006.01)
*B01D 35/02* (2006.01)
*B01D 35/30* (2006.01)
*F02M 37/36* (2019.01)
*F02M 37/48* (2019.01)

(52) U.S. Cl.
CPC .......... *B01D 35/30* (2013.01); *B01D 2201/16* (2013.01); *B01D 2201/302* (2013.01); *B01D 2201/304* (2013.01); *B01D 2201/4084* (2013.01); *F02M 37/36* (2019.01); *F02M 37/48* (2019.01)

(58) Field of Classification Search
CPC ........ B01D 2201/302; B01D 2201/304; B01D 2201/4084; B01D 2201/303; B01D 29/23; F02M 37/36; F02M 37/48
USPC .......... 210/767, 97, 130, 136, 440–444, 455
See application file for complete search history.

(56) References Cited

U.S. PATENT DOCUMENTS

| | | | |
|---|---|---|---|
| 4,179,373 A | 12/1979 | Sabich et al. | |
| 6,997,208 B2 * | 2/2006 | Mack | F01M 13/0011 |
| | | | 123/196 R |
| 2003/0127384 A1 | 7/2003 | Kapur | |
| 2018/0290083 A1 * | 10/2018 | Campbell | B01D 35/153 |

FOREIGN PATENT DOCUMENTS

| | | | |
|---|---|---|---|
| WO | 9604062 | 2/1996 | |
| WO | WO-9604062 A1 * | 2/1996 | ............. B01D 29/23 |

\* cited by examiner

FILTER VALVE ASSEMBLY

CROSS-REFERENCE TO RELATED APPLICATIONS

This application claims priority to European Patent Application No. 21461541.1 filed May 21, 2021, the entire contents of which is incorporated herein by reference.

TECHNICAL FIELD

The present disclosure is concerned with a valve assembly for a filter assembly such as, but not limited to, filters for fuel or oil or lubricant in machines or vehicles, e.g., a fuel filter in a vehicle or an aircraft.

BACKGROUND

Filters are provided in various applications to filter fluid flowing along a fluid flow path in order, for example, to remove particles or contaminants from the fluid. The present disclosure is concerned with the type of filter having a fluid inlet and a fluid outlet and a filter path between the inlet and the outlet, wherein the filter path passes through a filter medium arranged to remove the material to be filtered from the fluid before it arrives at the outlet. Such filters find use in e.g. vehicle fuel systems, where fuel is drawn from a reservoir by a pump and delivered to the engine. Filters are provided in the flow path to remove any particulate matter or debris and to ensure that the fuel reaching the engine is as clean as possible to avoid damage to the engine and permit optimal engine performance. Such filter assemblies may comprise a manifold with an inlet and outlet for connection to the fuel lines and a filter material. This may be provided in a filter cartridge removably attached to the manifold. Filters are also used to filter lubricant fluid e.g. oil and whilst the assembly of the disclosure is described in relation to fuel supply systems, this is by way of example only and the principles may apply equally to filters for lubricant or other fluids. In vehicles, and particularly in aircraft, the effectiveness and reliability of the filters is important for performance, efficiency and safety.

Over time, the filter material may become clogged presenting an impedance to the flow of fluid through the filter. To avoid the engine being cut off from the fuel supply when the filter medium is clogged, most fuel supply systems will provide a way to bypass the filter medium in the event of it becoming clogged since it is important for the engine to receive some fuel, even if it contains debris, rather than no fuel at all. The bypass system will allow fuel to flow to the engine until such time that the filter material can be replaced e.g. by removing and replacing the filter cartridge.

Current filter bypass systems tend to be large and complex and this adds considerably to the cost, weight and size of the filter assembly.

Further, as mentioned above, when the filter medium becomes clogged or has exceeded its useful or permitted life, it needs to be removed and replaced. Conventionally, this requires the fuel system, and therefore the engine, to be switched off while the filter medium is removed, leading to undesirable downtime.

There is a need for a bypass system for a filter assembly that is simple, small and lightweight whilst maintaining reliability. There is also a need for an automatic shut-off system that allows a filter to be removed and replaced without the need to shut-off the entire fuel system and to avoid leakage during removal of the filter cartridge.

SUMMARY

The assembly according to this disclosure is a valve assembly comprising a bypass valve and a shut-off valve that are integrated inside the housing or manifold of a filter assembly and that are automatically actuated.

According to an aspect of the disclosure, there is provided a filter assembly comprising: a manifold having a fluid inlet and a fluid outlet, a filter housing having a filter medium provided therein, the filter medium defining an inner filter chamber and defining an outer filter chamber between the filter medium and the filter housing, the filter housing being removably attached to the manifold so as to provide a fluid flow path from the inlet into the inner filter chamber, through the filter medium into the outer chamber and out of the outlet; characterized by the filter assembly further comprising a valve assembly mounted inside the manifold, and a by-pass channel defined inside the manifold between the fluid inlet and the fluid outlet; the valve assembly comprising a valve spool and a valve spring arranged in engagement with the spool to bias the spool into a first position and to compress, in response to a pressure differential across the valve spool exceeding the spring force, to move the spool to a second position, being a bypass position in which a bypass channel is opened to direct flow from the fluid inlet to the fluid inlet without passing through the filter medium, the valve assembly further comprising an adjust screw having a predetermined length such that when the spool is in the first position, the adjust screw abuts against the spool, and wherein as the filter housing is being detached from the manifold, the adjust screw moves away from engagement with the spool allowing the spring to expand to move the spool to a third, shut off position whereby flow from the inlet is cut off from entering the filter housing and whereby the bypass channel is also closed.

Also disclosed is a fuel filter, a method of filtering fluid and a method of detaching the filter housing from the manifold.

Preferred embodiments of the invention will now be described in more detail, by way of example only, with reference to the drawings.

DETAILED DESCRIPTION

Figure 1:
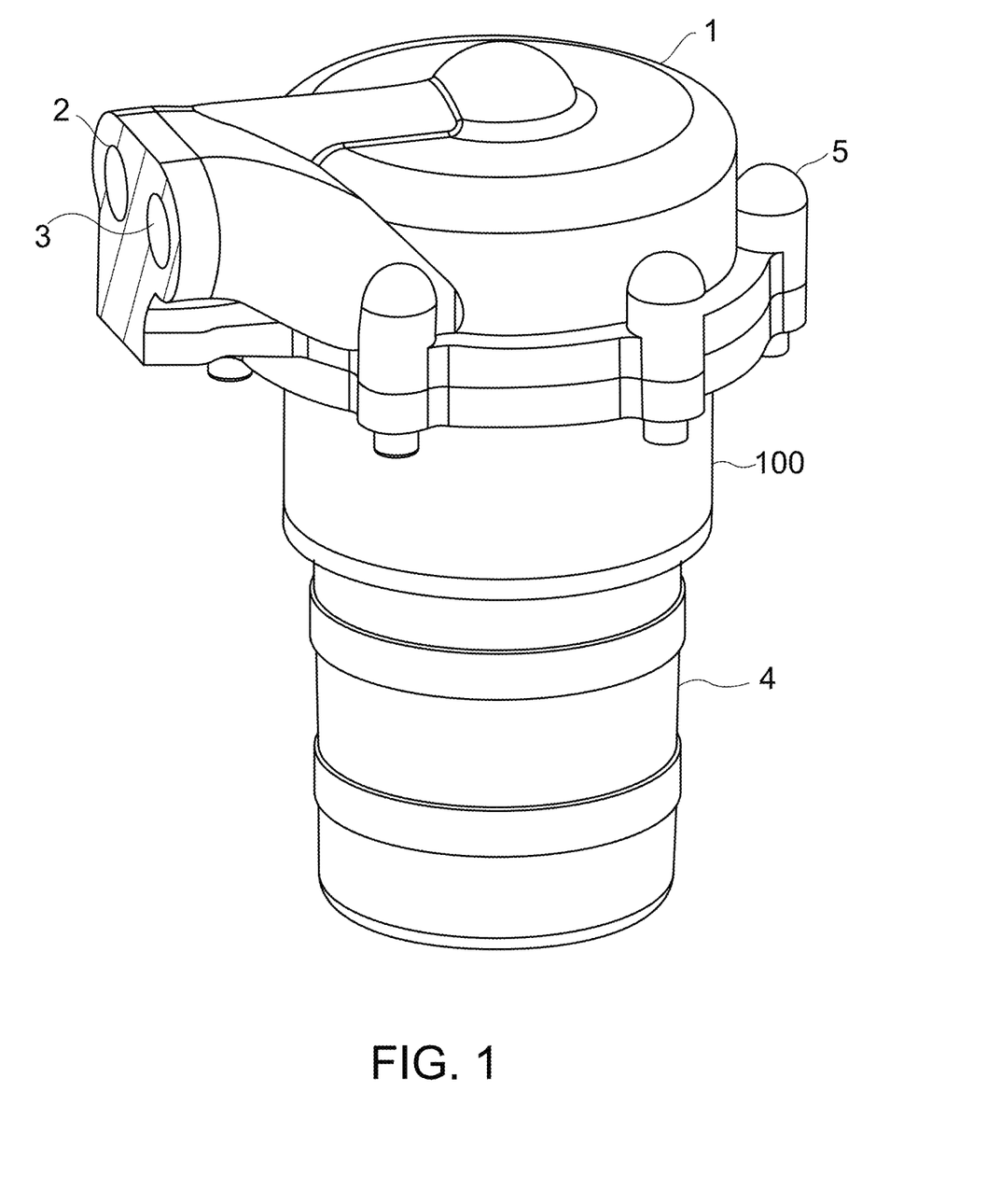
FIG. 1 is a perspective view of a filter assembly.

FIG. 1 shows a filter assembly such as those used in fuel systems or the like. Such filters may be placed between the fuel reservoir and the fuel pump and/or between the pump and the engine, to remove debris, particulate matter etc. from the fuel before it reaches the engine. The outer shape and structure of the filter is as is known in the field and is designed to fit in a fuel supply system of the vehicle/aircraft etc. The aim of the present disclosure is to provide a by-pass and shut off system that can be integrated into such a filter assembly without changing the design or the envelope of the exterior of the assembly.

The filter assembly includes a filter manifold 1 having a fluid inlet 2 and a fluid outlet 3. The inlet 2 is configured to be connected to a fluid line from the reservoir or pump (not shown) supplying fluid/fuel to be filtered. The following description will refer to a fuel filter, but it should be understood that the fluid could be other than fuel and reference to fuel is by way of example only.

Figure 2:
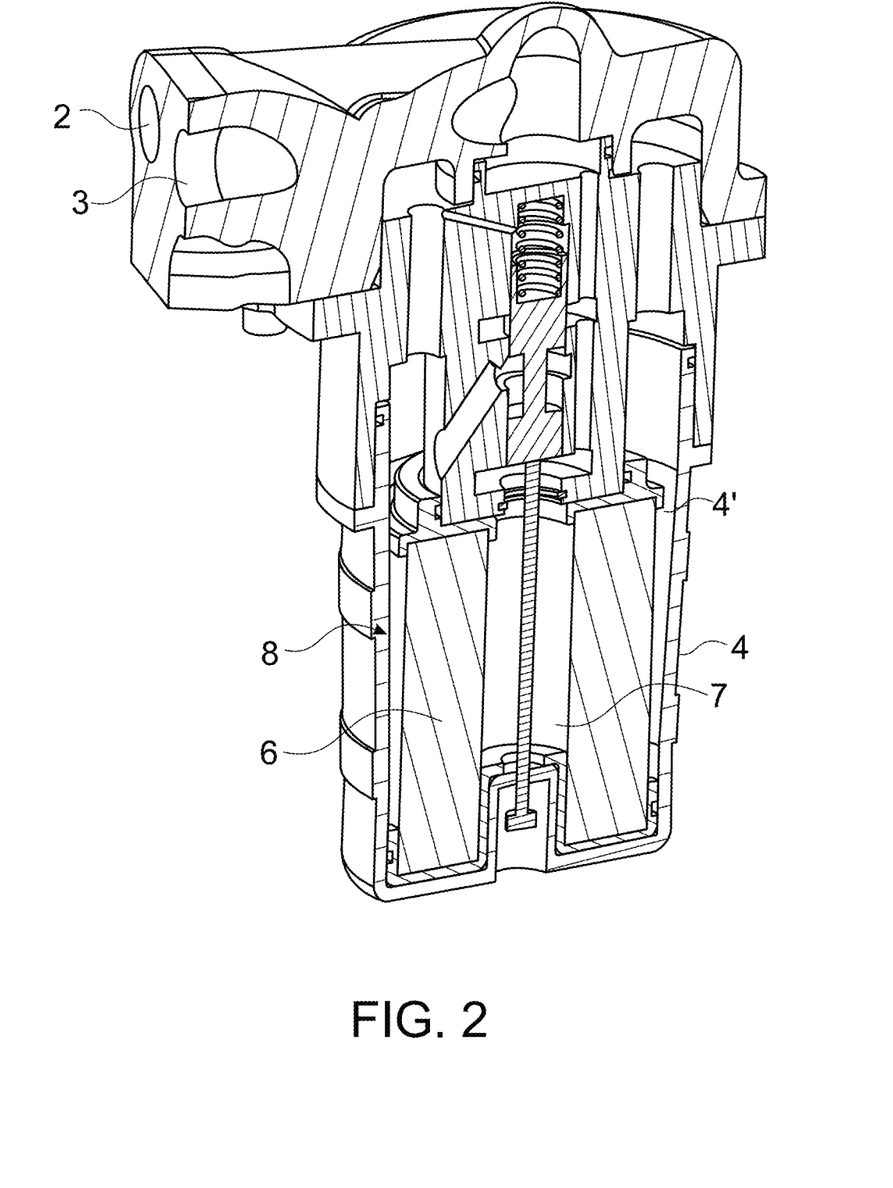
FIG. 2 is a cut-away view of a filter assembly as shown in FIG. 1 and in accordance with the disclosure.

The outlet 3 is configured to be connected to a fluid line for providing the filtered fluid to the pump (if the filter is between the reservoir and the pump) or to the end user of the fluid e.g. the engine (if the filter is between the pump and the engine). The manifold 1 is attached to a filter canister or bowl 4 by a connector 100, which houses the valve assembly described further below, and fasteners 5. A threaded connector 101 is provided between the connector and the bowl 4. As will be described further below with reference to the other drawings, fluid provided to the filter inlet passes from the manifold 1 into the filter canister or bowl 4. The filter bowl 4 contains a filter medium 6 which may be e.g. in the form of a cartridge fitted into the bowl. The filter medium 6 which may be e.g. paper or other known filter material is formed to define an inner chamber 7. An outer chamber 8 is defined between the filter medium 6 and the inner wall 4' of the filter bowl 4. Fluid from the inlet, passing into the filter, is directed into the inner chamber 7. Due to the pressure of the pump and the build-up of pressure in the inner chamber the fluid is forced outwards through the filter medium 6 into the outer chamber 8 and is then forced up to and out from the outlet 3. This is known and standard for such filter assemblies.

As mentioned above, problems can arise when the filter medium 6 becomes clogged or defective such that the fluid in the inner chamber 7 is not able to pass through the filter medium into the outer chamber and to the outlet. The fluid (fuel) would then not reach the engine.

Further, when the filter medium needs replacing, with known assemblies, the fluid supply needs to be cut off to prevent fluid flowing into the inlet so that the bowl 4 can be disconnected from the manifold without fluid leakage, and replaced with new filter medium and reattached before the fluid flow can be re-started.

According to this disclosure, a valve assembly is provided to regulate fluid flow when it cannot pass through the filter medium. The valve assembly is integrated into and inside the manifold of the filter assembly.

Figure 4:
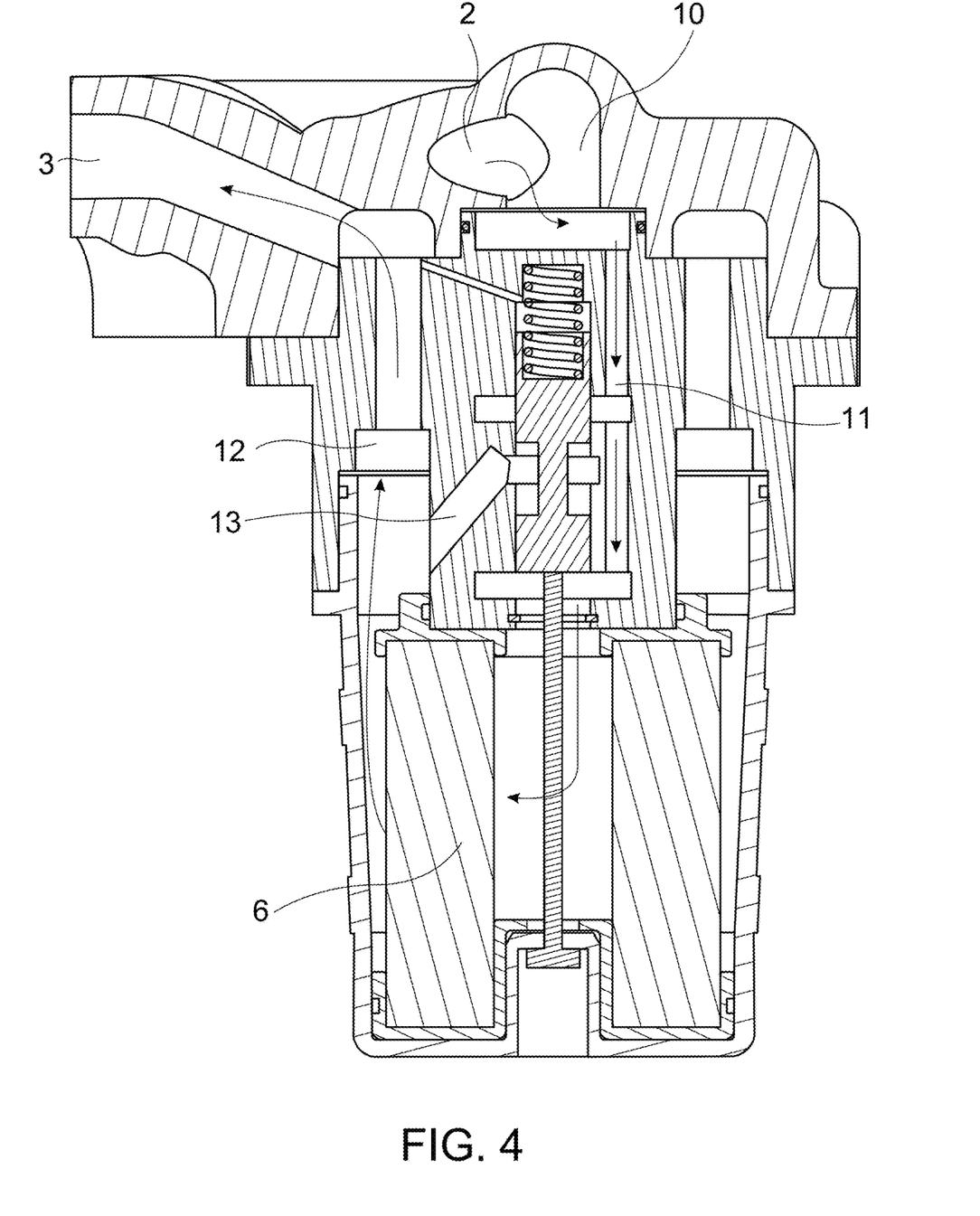
FIG. 4 shows the flow through the filter assembly in normal operation.

In normal operation, the fluid e.g. fuel flows into the inlet 2 in the manifold 1, as best seen by the arrows in FIG. 4. The fuel flows into a supply chamber 10 and along a supply channel 11, from where it flows into the inner chamber 7 of the filter. The fuel flows, under pressure of the pump, through the filter medium 6, where debris or contaminants are filtered from the fluid and retained in the filter medium 6. The filtered fluid then flows from the outer chamber 8 to an outlet chamber 12 and out of the filter via the outlet 3 of the manifold 1.

As mentioned above, the filter can become clogged and will, after a while, need to be removed and replaced. The valve assembly of this disclosure, as described in more detail below, acts to direct the fuel via a bypass channel 13 in the event that the filter becomes clogged, as indicated by an excessive pressure differential between valve control areas (as described further below and due to the pressure in the inner chamber increasing because the flow through the filter medium is hindered), thus bypassing the filter medium. This ensures that in such an event, fuel will continue to be provided to e.g. the engine even in the event that the filter is not usable. Of course, the output fuel will not be filtered, but some (unfiltered) fuel is preferable to no fuel at all.

The valve assembly also operates to shut off fuel flow through the filter in the event that the filter bowl 4 is removed e.g. for maintenance, so as to prevent fuel leakage. The shut off function shuts off the supply channel and, optionally, may also shut off the outlet chamber.

The valve assembly is located entirely within the envelope of the filter defined by the manifold, the connector and the filter bowl, and comprises a valve spool 20, a valve spring 21 and a sleeve 22 housing the spool 20 and the spring 21.

An adjust screw 23 is attached by a screw thread to, and extends from the bottom of the filter bowl 4 through the inner chamber 7 to the end of the spool 20 and abuts against the spool 20.

Figure 3:
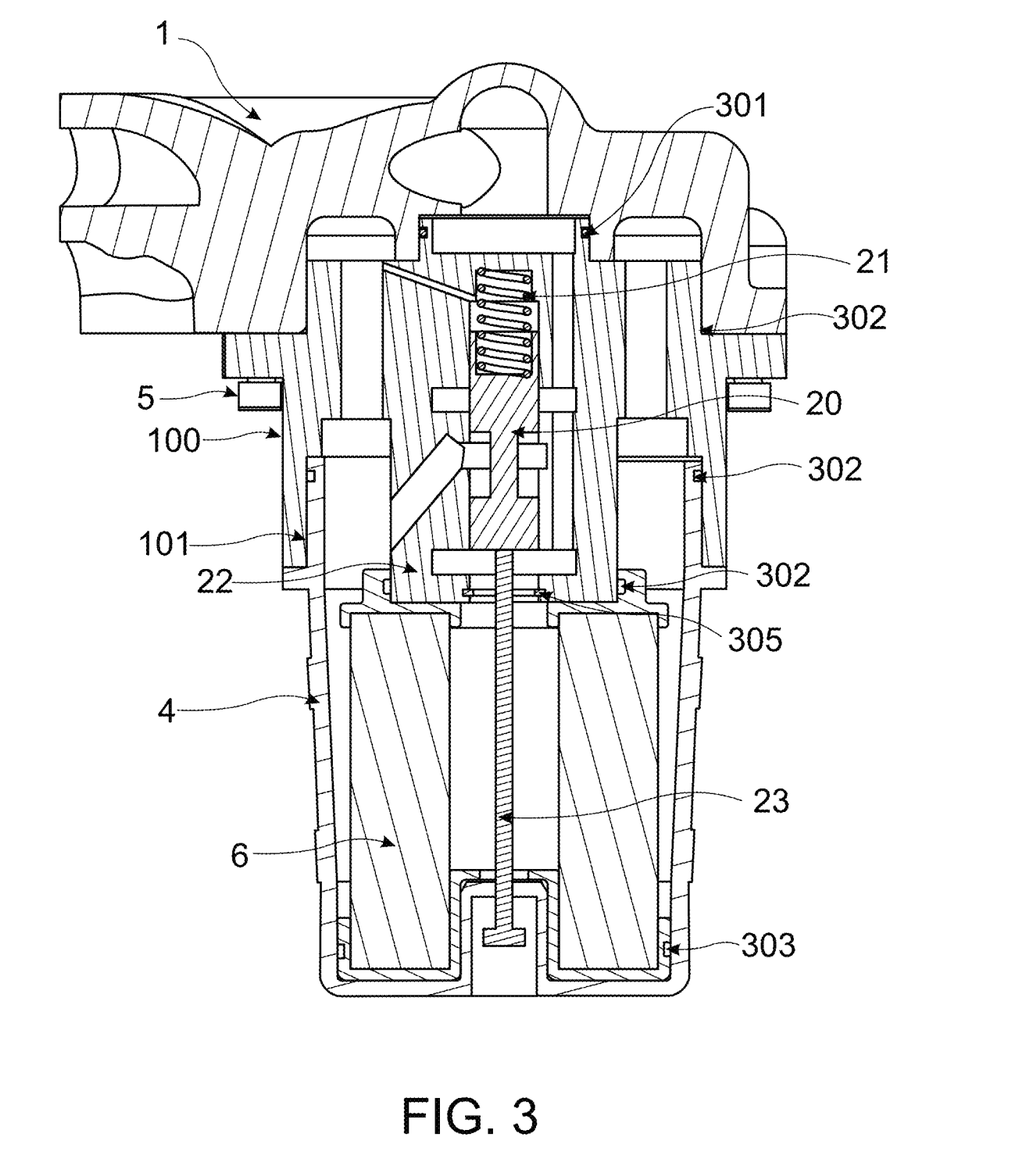
FIG. 3 show a sectional view of an assembly according to this disclosure.
Figure 6A:
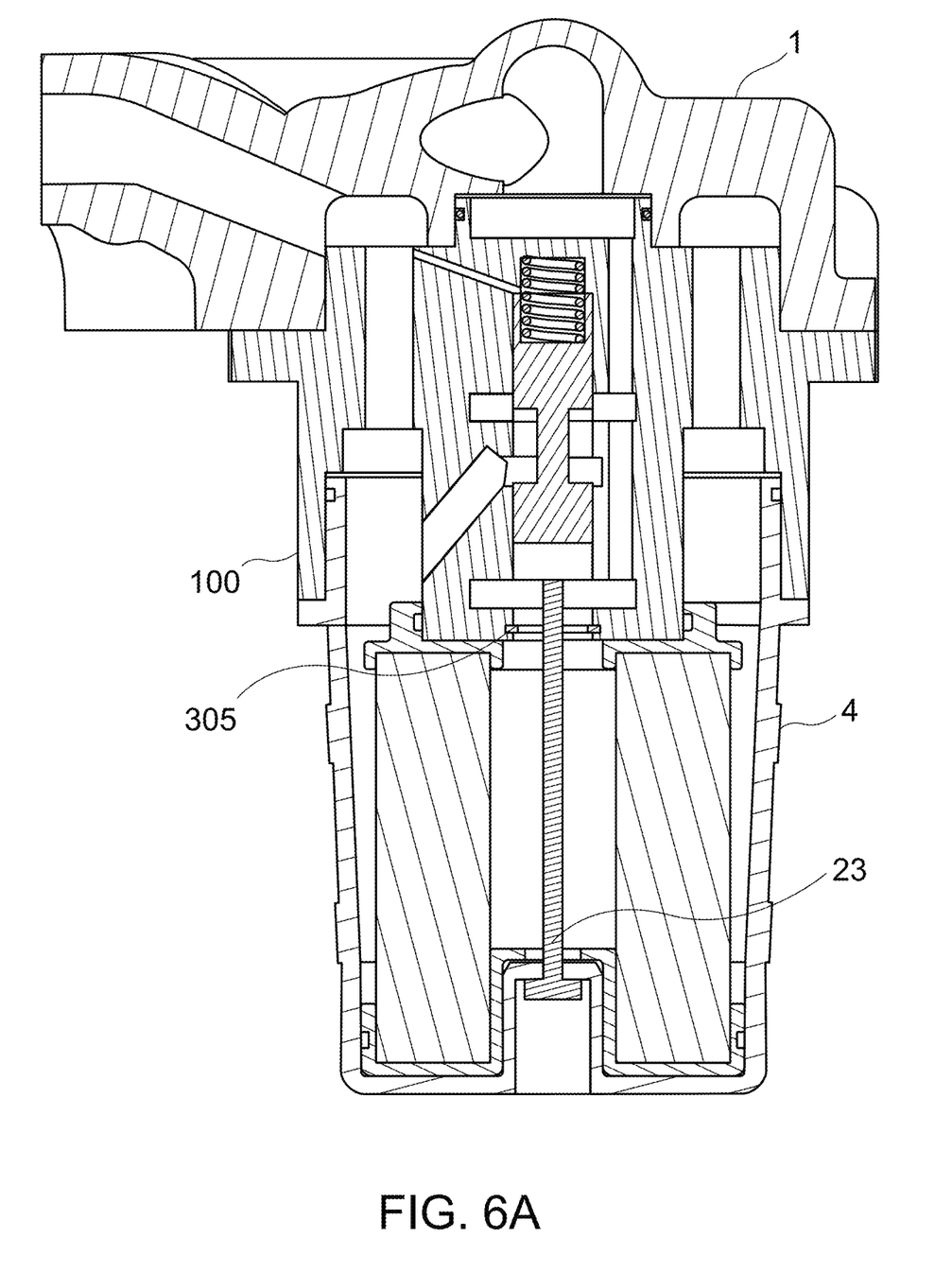
FIGS. 6A, 6B and 6C show operation of the shut off valve function.

The length of the adjust screw 23 is set, at assembly, such that it abuts against the spool 20, at one end of the screw, and against the bowl at the other end of the screw when the spool is in the normal operating position. The spring 21 acts against the other end of the spool 20. The spring force is selected to bias the spool to the normal operating position as shown in FIGS. 3, 4 and 6A. Seals, e.g. O-rings 301, 302, 303 and 304 are provided at appropriate positions to prevent leakage. A snap ring 305 is provided around the screw 23 where the filter bowl 4 meets the connector/valve housing 100.

The bypass operation will now be described in more detail with reference to FIG. 5. The valve spool 20 is positioned in relation to the bypass channel 13 and moved relative thereto by means of the spring 21 and the pressure differential across the spool control areas 401, 402 corresponding to inlet and outlet pressure. In normal operating conditions, as shown in FIG. 4, the pressure differential across the spool does not exceed the force of the spring 21 biasing the valve spool to its closed position. In this position, the spool body blocks the bypass channel 13. Fluid cannot, therefore, flow from the supply channel through the bypass channel and so is directed through the supply channel and through the filter medium as described above.

Figure 5:
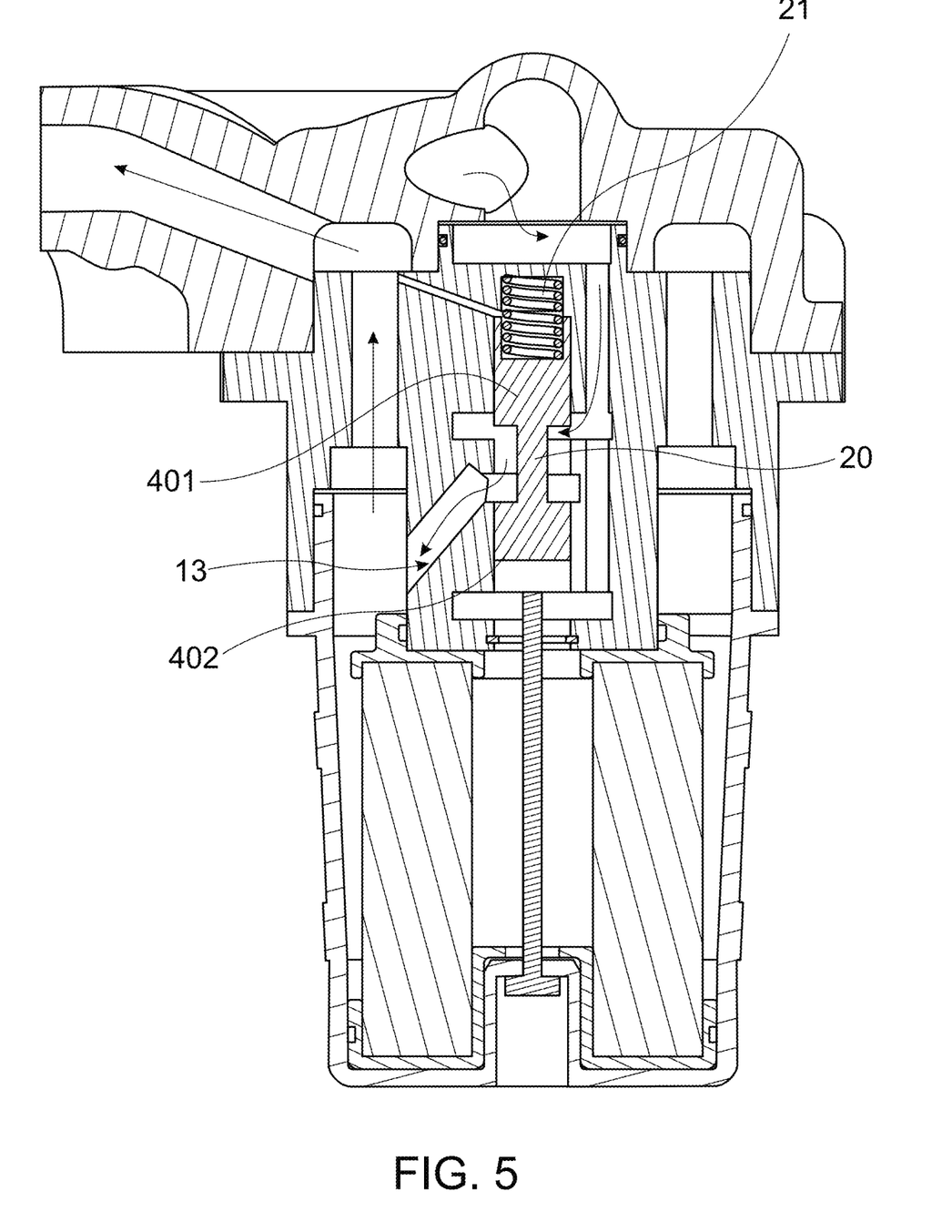
FIG. 5 shows the flow through the filter assembly in bypass operation.

If, however, the pressure in the inner chamber 7 becomes excessive and so the pressure differential across the control areas 401, 402 exceeds the spring force, the valve spool 20 is pushed against the spring force, as seen in FIG. 5, which opens the inlet channel which was previously covered by the spool. The inlet channel is then connected to the bypass channel 13 allowing for flow directly from the inlet to the outlet, bypassing the filter medium. Fuel entering the inlet is thus directed, as shown by the arrows in FIG. 5, from the supply chamber through the bypass channel 13, from where it flows to the outlet chamber and to the outlet 3 without passing through the filter medium 6.

Thus, bypass valve spring 21 controls the movement of the spool 20 based on the filter pressure difference, to open the bypass channel 13 if the pressure difference exceeds the predetermined threshold. The spring itself, however, is not located in the fluid flow path, but, rather, in a 'blind' cavity covered by the piston body. If the spring were in the fluid flow path, the fluid flow could excite the spring and cause resonance in the fluid. A spring in the fluid flow path would also disturb the flow. Further, if the spring were to be damaged, spring material could create debris in the system fluid flow, which could further damage the system.

When the pressure difference decreases again, the spool will move, under the force of the spring, back to the default position where the bypass channel is closed by the spool body and the fluid is then forced again from the inlet chamber into the inner chamber, through the filter medium to the outer chamber and the outlet chamber and out through the outlet.

The same valve assembly components are also configured to perform a shut off function that shuts off fuel flow when the filter bowl 4 is removed from the manifold 1 e.g. for maintenance. The shut off function is described with reference to FIGS. 6A to 6C.

FIG. 6A shows the manifold 1, connector/valve housing 100 and filter bowl 4 assembled as described above.

Figure 6B:
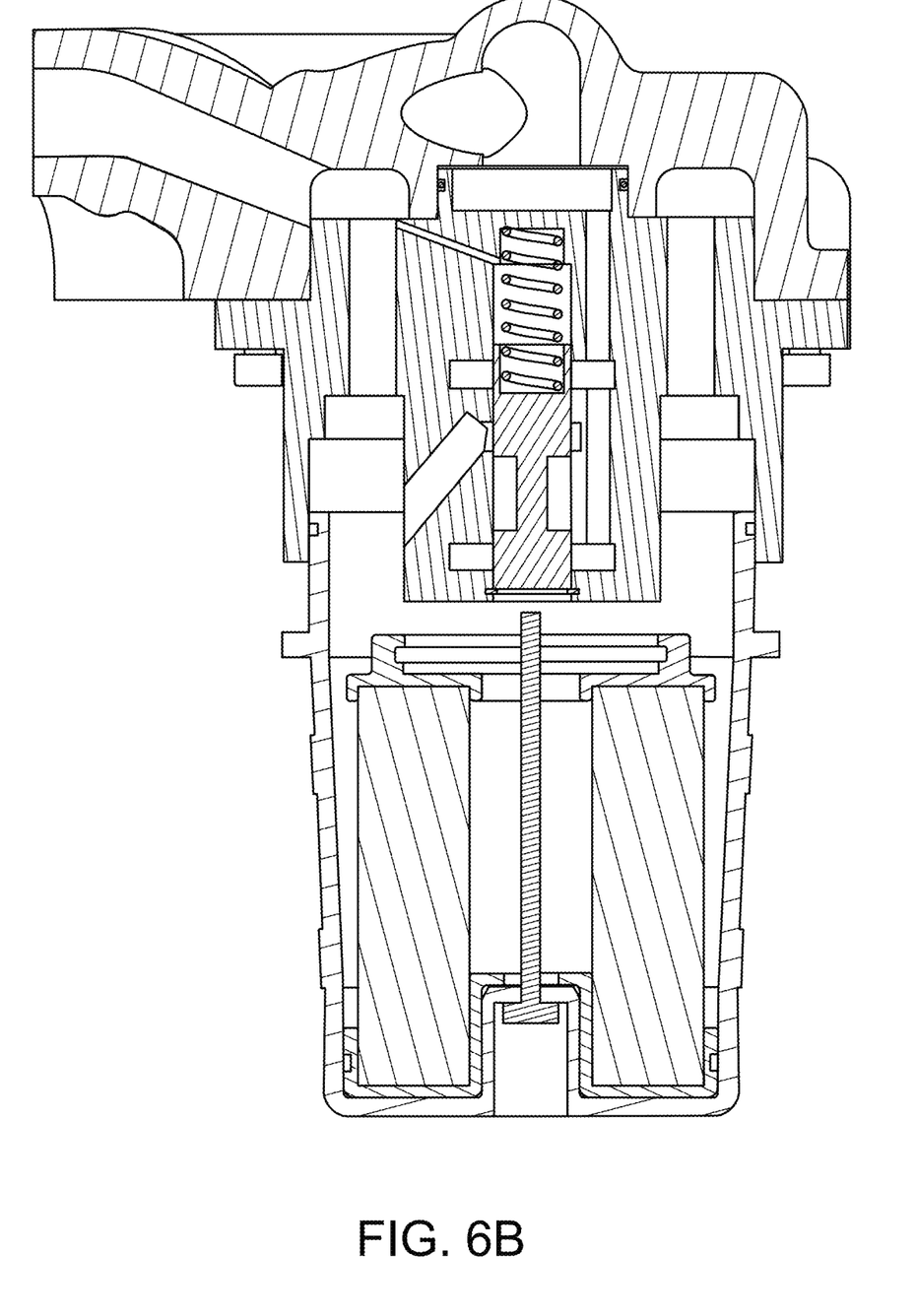
Figure 6C:
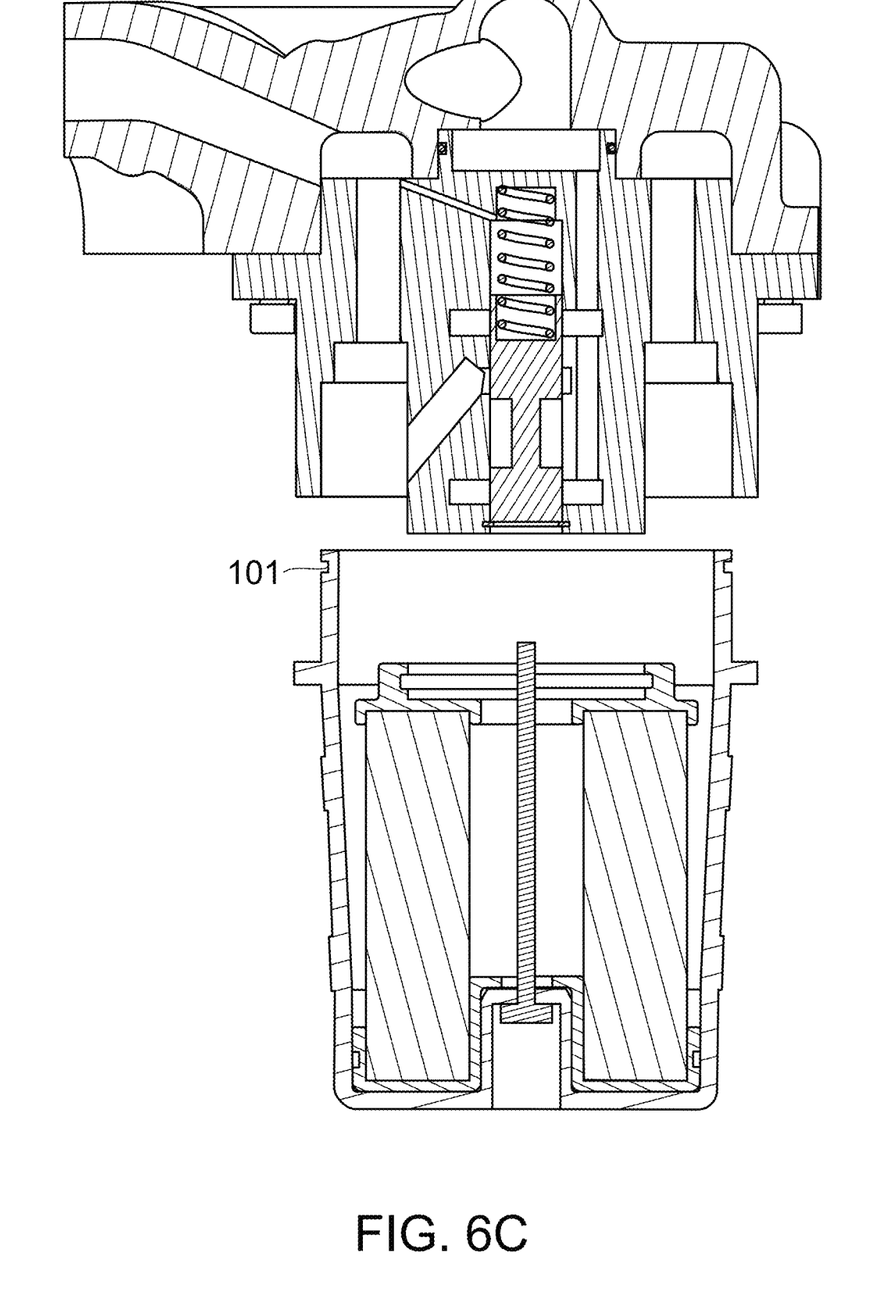

To remove the filter bowl 4, it is unscrewed from the connector 100 using the thread 101. FIG. 6B shows the assembly as the bowl is being unscrewed. FIG. 6C shows the filter bowl removed from the manifold 1.

While the bowl 4 is properly attached to the manifold (FIG. 6A), the adjust screw 23 engages with the valve spool 20 in its normal operating position. As the bowl is being unscrewed, the adjust screw 23 moves, with the bowl 4 away from the spool 20 or, put otherwise, the pressure the screw 23 exerts against the spool 20, against the spring 21, is reduced. Accordingly, the spring is able to expand thus pushing the spool in an axial direction to a shut off position as shown in FIG. 6B. The length of the adjust screw 23 and the force of the spring have been set such that during unscrewing, and before the bowl has been completely removed, the spool has been pushed by the spring to the shut off position where the flow path from the supply chamber to the inner chamber 7 is cut off by the spool body. When the bowl 4 is detached (FIG. 6C), the inlet flow is therefore closed off and there can be no fuel leakage from the manifold/connector. The snap ring 305 prevents the spool 20 from falling out of the valve housing 100.

When the filter bowl is reattached, the screw pushes against the spool and against the spring force to return the spool to the normal position to open the flow path again through the filter medium.

Thus, a single valve assembly of a spool, spring and adjust screw, mounted inside the filter assembly, performs both a bypass function and a shut off function when required.

The valve assembly of this disclosure can be located inside existing manifold designs and thus does not increase the envelope of the filter assembly. The valve assembly is relatively simple, small and lightweight and enables simple, quick and less frequent maintenance without fuel loss. Only a single spring is required for the valve assembly, which is advantageous because springs are expensive components. Further, the failure of any one valve component will not cause the loss of filter function. The valve assembly is reliable and durable thus reducing the costs and time of maintenance.

The invention claimed is:

1. A filter assembly comprising:
a manifold having a fluid inlet and a fluid outlet,
a filter housing having a filter medium provided therein, the filter medium defining an inner filter chamber and defining an outer filter chamber between the filter medium and the filter housing,
the filter housing being removably attached to the manifold so as to provide a fluid flow path from the inlet into the inner filter chamber, through the filter medium into the outer chamber and out of the outlet;
the filter assembly further comprising:
a bypass channel defined inside the manifold between the fluid inlet and the fluid outlet; and
a valve assembly mounted inside the manifold, the valve assembly comprising:
a valve spool and a valve spring arranged in engagement with the spool to bias the spool into a first position and to compress, in response to a pressure differential across the valve spool exceeding the spring force, to move the spool to a second position being a bypass position in which a bypass channel is opened to direct flow from the fluid inlet to the fluid outlet without passing through the filter medium,
the valve assembly further comprising an adjust screw having a predetermined length such that when the spool is in the first position, the adjust screw abuts against the spool, and wherein as the filter housing is being detached from the manifold, the adjust screw moves away from engagement with the spool allowing the valve spring to expand to move the spool to a third, shut off position whereby flow from the inlet is cut off from entering the filter housing and whereby the bypass channel is also closed.

2. The filter assembly of claim 1, further comprising a supply chamber between the fluid inlet and the inner filter chamber.

3. The filter assembly of claim 2, further comprising a supply channel fluidly connecting the supply chamber and the inner filter chamber.

4. The filter assembly of claim 1, further comprising an outlet chamber between the outer filter chamber and the fluid outlet.

5. The filter assembly of claim 1, further comprising a sleeve housing the spool and the valve spring.

6. The filter assembly of claim 1, further comprising sealing means between the manifold and the filter housing.

7. The filter assembly of claim 1, further comprising a snap ring around the adjust screw at an interface between the filter housing and the manifold.

8. A fuel filter arranged between a fuel supply and a fuel application and comprising:
the filter assembly of claim 1;
wherein the inlet is arranged to be connected to the fuel supply and the outlet arranged to be connected to the fuel application.

9. A method of providing fluid from a fluid source to a fluid application via a filter assembly as claimed in claim 1, the method comprising:
providing fluid from the fluid source to the fluid inlet, the fluid passing through the filter medium to provide filtered fluid to the fluid application via the fluid outlet, and wherein fluid is caused to flow from the inlet to the outlet without passing through the filter medium in response to the pressure differential across the valve spool exceeding the spring force.

10. A method of removing the filter housing from the manifold of the filter assembly as claimed in claim 1, comprising rotating the filter housing relative to the manifold until the adjust screw is at a position where the spool is in the shut off position and then detaching the filter housing from the manifold by further rotation of the filter housing relative to the manifold.

* * * * *